United States Patent [19]

Kemper

[11] 4,277,982

[45] Jul. 14, 1981

[54] TORQUE TRANSMITTING BODY FOR TRACTION DRIVE TRANSMISSIONS AND NORMAL FRICTION FORCE DEVELOPING METHOD

[75] Inventor: Yves J. Kemper, Birmingham, Mich.

[73] Assignee: Vadetec Corporation, Troy, Mich.

[21] Appl. No.: 77,833

[22] Filed: Sep. 21, 1979

[51] Int. Cl.³ .................... F16H 15/16; F16H 55/34
[52] U.S. Cl. ........................................ 74/191; 74/193
[58] Field of Search ................. 74/191, 192, 193, 214, 74/216

[56] References Cited

U.S. PATENT DOCUMENTS

| | | | |
|---|---|---|---|
| 2,660,897 | 12/1953 | Neidhart et al. | 74/208 X |
| 3,298,238 | 1/1967 | Lea | 74/191 |
| 3,910,137 | 10/1975 | Nedeljkovitch | 74/191 X |
| 4,112,779 | 9/1978 | Kemper | 74/191 |
| 4,112,780 | 9/1978 | Kemper et al. | 74/190 X |
| 4,152,944 | 5/1979 | Kemper | 74/191 |
| 4,152,946 | 5/1979 | Kemper | 74/193 |
| 4,208,926 | 6/1980 | Hanson | 74/191 |

Primary Examiner—Leslie Braun
Attorney, Agent, or Firm—Robert F. Ziems

[57] ABSTRACT

A torque transmitting body for continuously variable power transmissions of the type in which oppositely convergent, cone-like rolling surfaces of revolution about one axis are retained in torque transmitting rolling frictional engagement at two points of contact with complementing rolling surfaces of revolution about another axis inclined with respect to and intersecting the axis of the cone-like surfaces. The body includes a pair of oppositely convergent cone members telescopically interconnected at their base or large ends for relative rotary and axial movement. A cam assembly is included and acts between the cone members to develop an axial separating force in response to a torque differential between the cone members. Although both cone members are driven at equal speeds, only one is connected to an output torque load so that the torque differential caused by the load may be converted to an axial separating force on the cone members by the camming assembly.

10 Claims, 5 Drawing Figures

TORQUE TRANSMITTING BODY FOR TRACTION DRIVE TRANSMISSIONS AND NORMAL FRICTION FORCE DEVELOPING METHOD

BACKGROUND OF THE INVENTION

This invention relates to continuously variable traction drive transmissions and more particularly, it concerns improvements in torque transmitting bodies for such transmissions as well as in a method and structure for forcing complementary rolling surfaces incorporated in such transmissions into frictional torque transmitting engagement with each other.

In U.S. Pat. No. 4,112,779, No. 4,112,780 and No. 4,152,946 several continuously variable transmission embodiments are disclosed in which three frame supported working bodies operate to transmit a mechanical power input to a rotatable output at infinitely or continuously variable speed ratios within the design range of the particular transmission embodiment. In the transmissions of this general class, two of the working bodies are in frictional rolling contact with each other at two points of contact as a result of one of the two bodies being of a biconical configuration to define oppositely convergent rolling surfaces of revolution about one axis and the other of the two bodies taking the form of a rotatably coupled pair of rings defining complementary rolling surfaces about another axis inclined with respect to and intersecting the one axis. The rings are adjustable in a manner to vary the radius ratio of the contacting rolling surfaces and thus attain the continuously variable speed ratio for which the transmission is primarily intended.

Heretofore, a preferred way of retaining the engaged rolling surfaces in contact under normal force loads adequate to achieve torque transmission by friction has been to provide the biconical body as an assembly of two conical members on a common shaft in concentric fashion and to connect the shaft with a cam system operable to forcibly separate the cone members along the axis of the shaft in response to a torque differential between the shaft and the cone members. By coupling the shaft either directly or indirectly to the transmission output load, the force by which the cone members would be urged against the ring-like members could be made proportional to output load. A major difficulty with this approach to normal force development is that the nature and magnitude of the loads imposed on the assembly of cone members and shaft tend to deflect the shaft relative to the cone members causing the cone members to bind or otherwise develop an unwanted path of torque transmission between the shaft and the cone members. The effectiveness of the cam or ramp system operative between the shaft and the cone members is therefore reduced with the result that the normal forces developed at the points of frictional contact are lower than that required to handle the output load of the transmission. This situation, in turn, can result in slippage of the fritionally engaged surfaces, unequal loading at the two points of contact and other factors which reduce efficiency of power transmission and/or cause damage to transmission components. While various solutions to this problem have been proposed and demonstrated to be effective, in retrospect, such prior solutions have entailed structural complexity and compromise rather than elimination of potential sources of power transmitting efficiency losses and mechanical failure.

SUMMARY OF THE INVENTION

In accordance with the present invention, the biconical body in continuously variable transmissions of the general class represented by the aforementioned U.S. patents is constituted by two oppositely convergent cone members interconnected at the respective base or large diameter ends thereof for relative rotation and axial displacement with respect to each other. The body is made resistant to axial bending by a pilot cone, rigidly connected at its base to the base end of one of the cone members, extending to and journalled concentrically within the small end of the other of the two cone members.

To develop normal force components by which rolling or traction surfaces on the cone members are pressed into engagement with complementing rolling or traction surfaces of revolution about an axis inclined with respect to and intersecting the axis of the biconical body, the two cone members are in axial abutment with each other through complementing cam or ramp surfaces preferably, but not necessarily, located at the concentric small ends of the pilot cone and the other one of the two cone members. The cam or ramp surfaces operate to convert any torque differential acting between the cone members to an axial force or thrust acting to separate the cone members on the axis of the biconical body. In addition, an adjustable preload force may be imposed on the cone members by a set screw arrangement acting between them.

The axial separating or normal force developing function of the cam surfaces is made proportional to the torque load imposed on the biconical body by connecting only one of the two cone members in direct torque transmitting relationship with the output load of the transmission. Although both cone members are driven at the same speed during operation of the transmission and both share equally the torque load on the biconical body, any tendency for slippage as a result of increased output torque loads, for example, will cause a torque differential between the cone member connected to the output load and the other cone member to which output load torque is transmitted only through the cam or ramp surfaces. By appropriate selection of the cam or ramp angle, the cone members will undergo an axial separating force in response to the torque differential which may be made precisely proportional to output load.

Among the objects of the present invention are, therefore, the provision of an improved biconical body structure for transmissions of the type referred to; the provision of such a biconical body structure which is exceedingly simple in terms of parts required, highly resistant to unwanted axial deflection and capable of use with diverse normal force developing systems; the provision of an improved cam or ramp system by which relatively movable cone members constituting such a biconical body may be subjected to an axial separating force responsive to torque loading on the body; and the provision of a novel method for developing normal force components in continuously variable traction drive transmissions incorporating such a biconical body.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
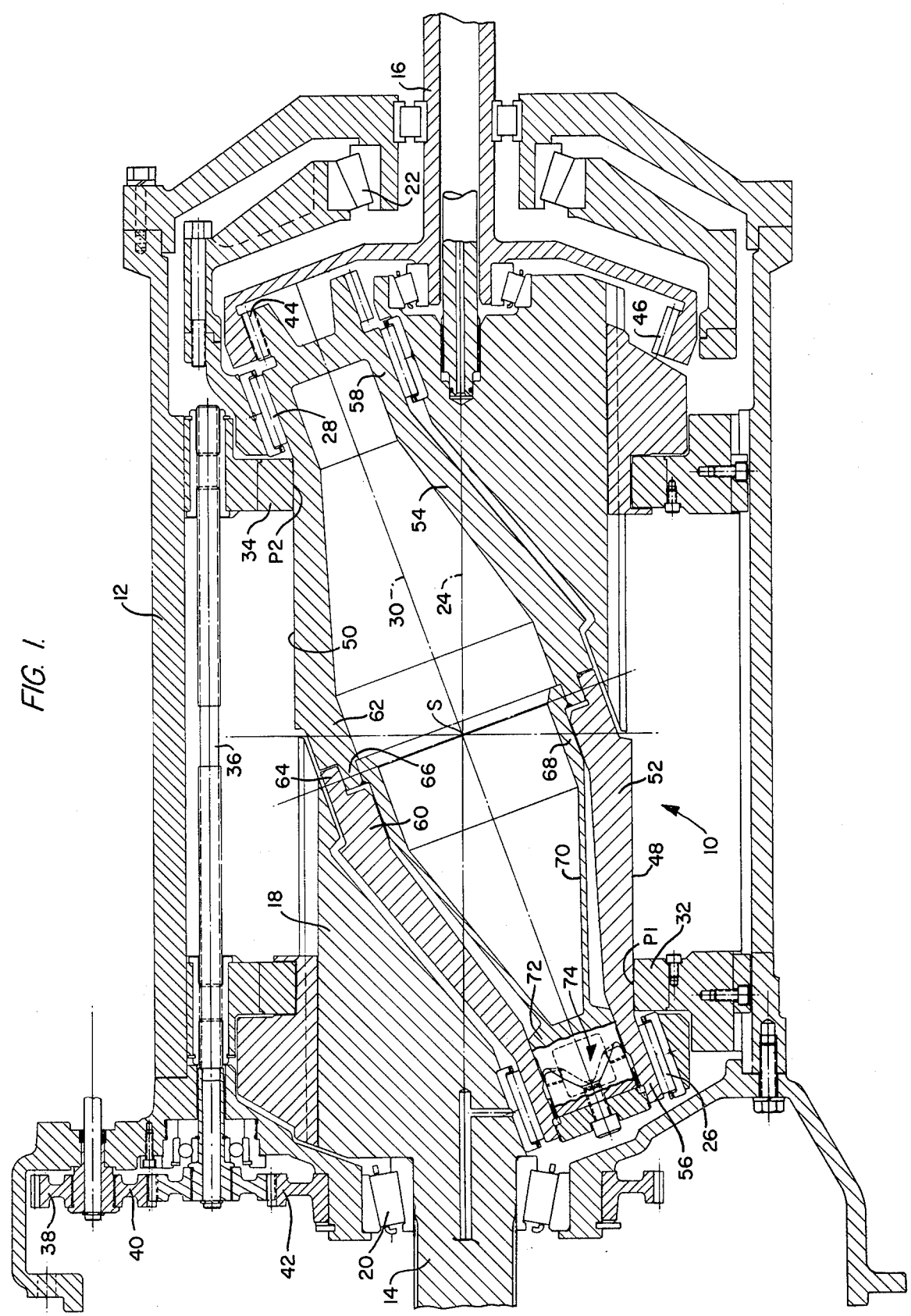
FIG. 1 is a longitudinal cross-section through a continuously variable torque transmission incorporating the invention.

In FIG. 1 of the drawings, the biconical torque transmitting body of the present invention, generally designated by the reference numeral 10, is shown incorporated in a continuously variable transmission unit having a frame 12, an input shaft 14 and an output shaft 16. Although the operating principles as well as many alternative structural embodiments of the overall transmission are disclosed in the aforementioned U.S. Pat. No. 4,112,779, No. 4,112,780 and No. 4,152,946 as well as in other commonly assigned patents and applications for patents, the transmission embodiment illustrated in FIG. 1 will be described summarily herein in the interest of providing a complete understanding of the biconical body 10 to which the present invention is primarily directed.

As may be seen in FIG. 1, the input shaft 14 is connected as an integral shaft extension with a cranking body 18 supported in the frame 12 by bearings 20 and 22 for rotation about a first axis 24. The biconical body 10, in turn, is supported directly from the cranking body 18 by bearings 26 and 28 to be rotatable on a second axis 30 inclined with respect to and intersecting the first axis 24 at a point S of axes intersection. Supported by and coupled against rotation with respect to the frame 12 are a pair of rings 32 and 34 which are capable of axial adjustment toward and away from the point S of axes intersection. In the disclosed embodiment, such axial adjustment of the rings 32 and 34 is effected by one or more oppositely pitched screws 36 rotatable by an external control (not shown) through gears 38 and 40 which are rotatable on axes fixed with respect to the frame 12. An additional control gear 42, rotatable with respect to the frame 12, is shown and in practice is used to synchronize rotation of the gear 40 with corresponding gears for additional sets of double pitched screws (not shown). A pinion gear 44 connected directly to the biconical body 10 in a manner which will be described in more detail below, meshes with a ring gear 46 coupled directly with the output shaft 16.

Consistent with the several transmission embodiments disclosed in the aforementioned U.S. patents, the biconical body 10 in the illustrated embodiment defines a pair of external conical surfaces 48 and 50 which are of revolution about the axis 30 and which function as rolling or traction surfaces. The surfaces 48 and 50 engage complementing internal traction surfaces on the rings 32 and 34 at two diametrically opposite points of contact P1 and P2. As a result of this frictional contact between the biconical body 10 and the rings 32 and 34, the rotational speed of the output shaft 16 is the product of both rotation of the cranking body 18 on the first axis 24, causing orbital or planetary movement of the pinion gear 44, and rotation of the pinion gear with the biconical body 10 on the axis 30. Thus, where $\overset{\circ}{a}$ is the rotational speed of the cranking body 18 about the axis 24; $\overset{\circ}{\theta}$ is the speed of rotation in the output shaft 16; $\overset{\circ}{\omega}$ is the ratio of the traction surface radius on the rings 32 and 34 to the radii of the conical surfaces 48 and 50 at the contact points P1 and P2; and k is the diametric ratio of the pinion gear 44 to the ring gear 46, the output/input speed ratio of the transmission is determined by the equation:

$$\overset{\circ}{\theta}/\overset{\circ}{a} = 1 - k\rho.$$

It will be apparent particularly from the several embodiments disclosed in U.S. Pat. No. 4,152,946 that this equation of output/input speed ratios represents but one mode of operating the general type of transmission represented by the embodiment illustrated in FIG. 1. Also in this respect, it should be noted that in the illustrated embodiment the biconical member 10 undergoes a nutational movement as a result of its being supported on the second axis 30 by the cranking body 18. In other forms of the same basic transmission and as disclosed in U.S. Pat. No. 4,152,946, the biconical body 10 may be concentric with the first axis 24 and coupled directly with an output shaft whereas the rings 32 and 34 are concentric with the second axis 30 and, as such, carried in nutation by the equivalent of the cranking body 18. As will be apparent from the description to follow, the structure and function of the biconical body 10 is equally applicable to either form of transmission in this general class.

As may be seen in FIG. 1, the conical surfaces 48 and 50 are the external surfaces of two cone members 52 and 54, respectively. In the illustrated embodiment, both cone members 52 and 54 are hollow and extend at their small ends as cylindrical inner race portions 56 and 58 for rotatable support by the respective bearings 26 and 28. Each of the two cones has a relatively large diameter or base end 60, 62 shaped to define telescopic journal formations 64 and 66, respectively. As a result of the journal formations, the cone members 52 and 54 may rotate relative to each other and also slide longitudinally along the axis 30 in relation to each other.

As mentioned above, the pinion gear 44 by which torque is transmitted from the biconical body 10 to a driven load through the output shaft 16 is coupled for rotation with the body 10. In accordance with the present invention, the sole direct connection of the pinion gear 44 to the body 10 is with the cone member 54. Thus in the illustrated embodiment, the gear 44 is formed as an integral extension at the small end of the cone member 54.

To establish a torque path from the cone member 52 to the pinion gear 44 as well as to render the assembly of the two cones 52 and 54 resistant to bending on the axis 30, the base end 62 of the cone member 54 is secured, such as by welding, to the base end 68 of a pilot cone 70, the small end 72 of which is rotatably and slidably received in the bearing race portion 56 at the small end of the cone member 52. A cam or ramp assembly 74 operates as the sole torque transmitting coupling between the cone member 52 and the pinion gear 44 through the pilot cone 70 and the cone member 54 in a manner to be described in more detail below.

Figure 2:
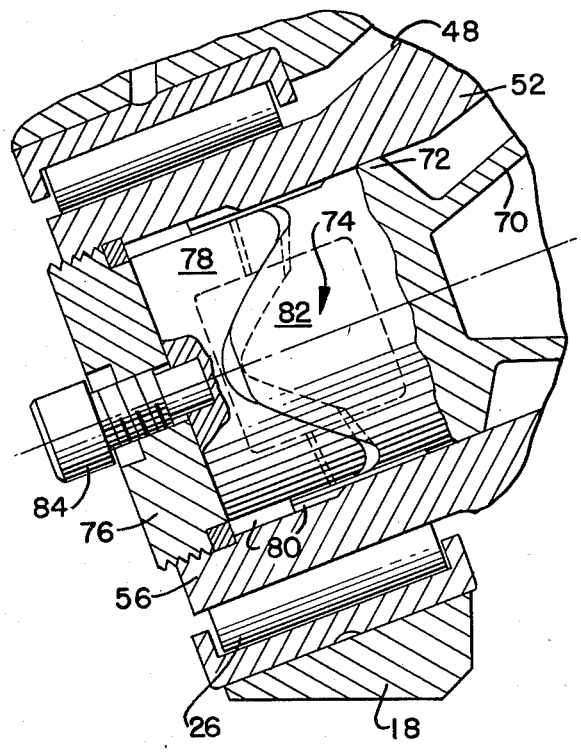
FIG. 2 is an enlarged fragmentary cross-section in the same cutting plane as FIG. 1.
Figure 3:
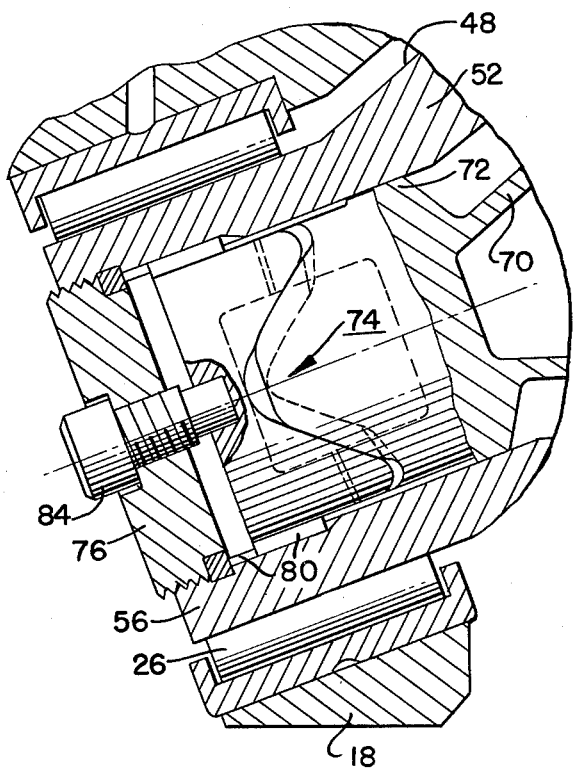
FIG. 3 is an enlarged fragmentary section similar to FIG. 2 but illustrating components in a different orientation.

In the illustrated embodiment, the cam assembly 74 is located within the bearing race portion 56 at the small end of the cone member 52. As shown most clearly in FIGS. 2-5 of the drawings, the assembly 74 includes a thrust plate or plug 76 threadably or otherwise anchored against axial displacement with respect to the cone member 52, a cylindrical cam member 78 coupled by splines 80 for direct rotation with the cone member 52 and a complementing cylindrical cam portion 82 integral with or otherwise nonrotatably fixed at the small end 72 of the pilot cone 70. A set screw 84 is threadably received in the thrust plate 76 and is in abutting relationship with the cam member 78. As may be seen by comparing the illustrations in FIGS. 2 and 3, the splines 80 are of a length sufficient to enable the cam 78 to be adjustably positioned axially in the race portion 56 of the cone member 52 by appropriate adjustment of the set screw 84.

Figure 4:
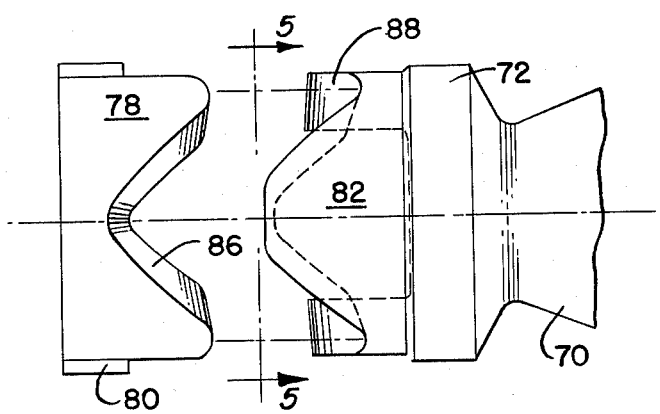
FIG. 4 is an exploded side elevation illustrating components of the invention.
Figure 5:
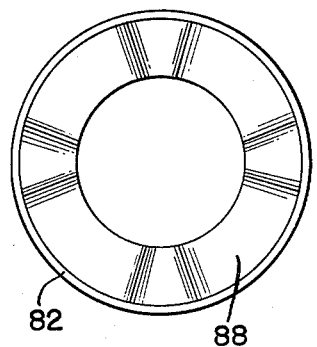
FIG. 5 is an end view as seen on line 5—5 of FIG. 4.

As shown in FIGS. 4 and 5, cam members 78 and 82 are each provided with complementing annular end camming faces 86 and 88, respectively. These surfaces define a ramp angle by which an angular or rotational force (i.e. torque) is resolved into an axial component of force operating to separate the cam members 78 and 82 axially. The axial separating force is, therefore, proportional to torque transmitted between the cam members 78 and 82 and the magnitude of that axial force for a given torque will be determined by the ramp angle of the engaged camming surfaces 86 and 88. The camming surfaces 86 and 88 are, moreover, bidirectional in the sense that the same axial component of force will be developed irrespective of the relative direction of torque transfer between the cam members 78 and 82.

Because of the direct torque path between the cam member 78 and the cone member 52 and between the cam member 82 and the cone member 54 through the pilot cone 70, the torque transmitted by the camming surfaces 86 and 88 will be the torque differential between the cone members 52 and 54. The development of this torque differential and its effect on the operation of the overall transmission in which the biconical body 10 is designed for use may now be understood.

As above mentioned, in the operation of the transmission illustrated in FIG. 1, torque transmission from the input shaft 14 and the cranking body 18 to the biconical body 10 is by friction between the rings 32, 34 and the cone members 52, 54 at the two points of contact P1 and P2. Assuming that the two points P1 and P2 are maintained in symmetry with respect to the point S of axes intersection during operation by appropriate adjustment of the rings 32 and 34, the torque transmitted at the points P1 and P2 will be equal, in the same direction and, as such, represent an equal division or splitting of torque delivered to the pinion gear 44. Assuming further that the set screw 84 has been adjusted to preload the conical surfaces 48 and 50 into engagement with the inner surfaces of the rings 32 and 34, no relative movement between the cone members 52 and 54 will occur at torque loads on the output shaft until the normal force required at the point P2 exceeds that developed by the set screw preload. When the torque load on the output shaft 16 exceeds the normal force preload at the point P2, a measure of slippage will occur between the traction surface 50 and the complementing traction surface on the interior of the ring 34. Because the cone member 52 is not connected directly to the pinion gear 44, however, the same tendency for slippage will not exist at the point P1 except as a result of torque transmitted through the cam assembly 74. Since any torque differential at the cam assembly 74 will be resolved into an axial separation of the cone members 52 and 54 the normal force development at both points P1 and P2 will increase in proportion to the load on the output shaft 16. In this way, the normal force loading of the conical surfaces 48 and 50 against the rings 32 and 34 may be made proportional to torque loads on the output shaft.

Thus it will be seen that as a result of the present invention, an improved torque transmitting body structure and method is provided for continuously variable torque transmission and by which the above-mentioned objectives are completely fulfilled. In particular, it will be noted that the assembly of the cone members 52 and 54 together with the pilot cone 70 render the body extremely resistent to deflection from the axis 30. The location of the cam assembly 74 at one end of the body isolates the assembly 74 from any deflection in the body as might occur due to the forces applied to the body as well as the innate elasticity of the material from which the body is formed. Also, the hollow configuration of the cone members facilitates either the addition or substitution fo a hydraulic normal force developing means to or for the cam assembly 74. Furthermore, the innate simplicity of the structure is apparent from the drawing illustrations.

Modifications and/or changes in the illustrated embodiment are contemplated and will be apparent to those skilled in the art from the preceding description. Accordingly, it is expressly intended that the foregoing description and accompanying drawing illustrations are of a preferred embodiment only, not limiting, and that the true spirit and scope of the present invention be determined by reference to the appended claims.

I claim:

1. In a continuously variable power transmission including a body having a pair of cone members arranged with the respective large diameter ends thereof adjacent to each other to define oppositely convergent, cone-like rolling surfaces of revolution about one axis and to which torque is transmitted by rolling frictional engagement of said cone-like surfaces at two points of contact with complementing rolling surfaces of revolution about another axis inclined with respect to and intersecting said one axis so that the normal force by which said rolling surfaces are retained in contact may be developed by axial separation of said cone-like surfaces, the output load of the transmission being driven by torque so transmitted to said body, the improvement comprising:

telescopic means connecting said cone members for relative rotary and axial movement;

means connecting the output load of the transmission to one of said cone members; and means for developing an axial separating force on said cone members in response to a torque differential between said cone members.

2. The apparatus recited in claim 1, wherein said telescopic means comprises complementing journal formations at the respective large diameter ends of said cone members.

3. The apparatus recited in claim 2, wherein said telescopic means comprises a pilot cone rigidly secured at the base end thereof to the large diameter end of one of said pair of cone members and extending within the other of said pair of cone members to the small diameter end thereof.

4. The apparatus recited in claim 3, wherein both of said cone members include cylindrical bearing portions projecting from the small diameter ends thereof.

5. The apparatus recited in claim 4, wherein said axial force developing means comprises a cylindrical cam assembly defining annular end camming faces, one of said faces being coupled rotatably to each of said cone members.

6. The apparatus recited in claim 5, wherein said cam assembly is located within the cylindrical bearing portion of the other of said cone members.

7. The apparatus recited in claim 5, wherein one of said camming faces is axially adjustable and including means to axially position said one camming face with respect to the cone member with which it is rotatably coupled.

8. The apparatus recited in claim 7, wherein said means to axially position said one camming face comprises axial force developing means by which said cone members may be placed under an axial preload through said cam assembly.

9. The method for developing normal force components by which a pair of rolling surfaces on a torque transmitting body are retained in frictional engagement with complementing rolling surfaces at two points of contact through which torque is normally transferred by friction in equal amounts, said method comprising the steps of:

supporting said pair of rolling surfaces for independent rotation relative to each other on a common axis;

coupling said pair of rolling surfaces to a torque load by directly connecting only one of said pair to said torque load and by connecting the other of said pair indirectly to said torque load through said one rolling surface to divide said torque load equally between said pair of rolling surfaces when said torque load is constant;

developing an axial force between each of said pair of rolling surfaces in proportion to the difference in torque imposed directly on said one rolling surface and indirectly on said other rolling surface when said torque load varies; and resolving said axial force into normal force components retaining said pair of rolling surfaces in frictional engagement with the complementing rolling surfaces.

10. The method recited in claim 9, comprising the additional step of preloading said pair of rolling surfaces into frictional engagement with said complementing rolling surfaces.

* * * * *